(12) United States Patent
Gupta

(10) Patent No.: US 7,920,658 B2
(45) Date of Patent: Apr. 5, 2011

(54) EFFICIENT METHOD TO COMPUTE ONE SHOT FREQUENCY ESTIMATE

(75) Inventor: Alok Kumar Gupta, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1403 days.

(21) Appl. No.: 11/369,328

(22) Filed: Mar. 6, 2006

(65) Prior Publication Data

US 2006/0217084 A1 Sep. 28, 2006

Related U.S. Application Data

(60) Provisional application No. 60/660,888, filed on Mar. 10, 2005.

(51) Int. Cl.
H04L 27/06 (2006.01)
G06F 1/02 (2006.01)

(52) U.S. Cl. .................... 375/344; 375/346; 455/113

(58) Field of Classification Search .......... 455/112–113, 455/71, 75, 164.1–164.2, 136, 182.1–182.2; 375/222, 260, 295, 316, 344, 354, 362; 370/203, 370/206–208, 335, 342; 708/277, 309
See application file for complete search history.

(56) References Cited

U.S. PATENT DOCUMENTS

| 4,675,882 | A | 6/1987 | Lillie et al. |
| 5,067,139 | A | 11/1991 | Baker et al. |
| 5,282,228 | A | 1/1994 | Scott et al. |
| 7,221,721 | B2 * | 5/2007 | Kim et al. ............ 375/344 |
| 7,519,134 | B1 * | 4/2009 | Heistermann et al. ....... 375/329 |
| 7,590,193 | B2 * | 9/2009 | Han ................ 375/326 |
| 7,646,784 | B2 * | 1/2010 | Kim et al. ........... 370/436 |
| 2004/0096019 | A1 | 5/2004 | Kim et al. |
| 2006/0045137 | A1 * | 3/2006 | Kim et al. ........... 370/516 |
| 2007/0268976 | A1 * | 11/2007 | Brink et al. ........ 375/260 |
| 2010/0020905 | A1 * | 1/2010 | Mansour et al. ....... 375/343 |
| 2010/0061487 | A1 * | 3/2010 | Kumar et al. ........ 375/322 |

FOREIGN PATENT DOCUMENTS

| JP | 10117178 | 5/1998 |
| RU | 94034112 | 7/1996 |
| WO | WO9620540 A2 | 7/1996 |
| WO | WO2004008706 A2 | 1/2004 |
| WO | WO2006099323 A1 | 9/2006 |

OTHER PUBLICATIONS

Vern, J. L: "Synthese De La Fonction ARC Tangente" Electronique Radio Plans, SPE, Paris, FR. No. 559, Jun. 1, 1994, pp. 41-42.
Young-Hoon, Ban et al: "The low-area of new arc-tangent look-up table and a low overhead for CATV modem systems" ASICS, 1999. AP-ASIC '99. The First IEEE Asia Pacific Conference on Seoul, South Korea Aug. 23-25, 1999, Piscataway, NJ, USA, IEEE, US. Aug. 23, 1999, pp. 33-36.

* cited by examiner

Primary Examiner — Pablo N Tran
(74) Attorney, Agent, or Firm — Gerald P. Joyce, III

(57) ABSTRACT

Systems and methods are provided for efficiently determining frequency estimates in a forward link only wireless receiver. In one embodiment, a method is provided to compute a one shot frequency estimate. The method includes representing an arc tangent function in a table that describes elements of the function and employing the arc tangent function to compute phase information for a wireless device.

34 Claims, 10 Drawing Sheets

EFFICIENT METHOD TO COMPUTE ONE SHOT FREQUENCY ESTIMATE

CROSS REFERENCE TO RELATED APPLICATION

This application claims the benefit of U.S. Provisional Patent Application Ser. No. 60/660,888 filed on Mar. 10, 2005, entitled "Method to Compute One Shot Frequency Estimate" the entirety of which is incorporated herein by reference.

BACKGROUND

I. Field

The subject technology relates generally to communications systems and methods, and more particularly to systems and methods that determine frequency estimates in an efficient manner for a forward link only wireless system.

II. Background

One technology that has dominated wireless systems is Code Division Multiple Access (CDMA) digital wireless technology. In addition to CDMA, an air interface specification defines FLO (Forward Link Only) technology that has been developed by an industry-led group of wireless providers. In general, FLO has leveraged the most advantageous features of wireless technologies available and used the latest advances in coding and system design to consistently achieve the highest-quality performance. One goal is for FLO to be a globally adopted standard.

The FLO technology was designed in one case for a mobile multimedia environment and exhibits performance characteristics suited ideally for use on cellular handsets. It uses the latest advances in coding and interleaving to achieve the highest-quality reception at all times, both for real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia multicasting complements wireless operators' cellular network data and voice services, delivering content to the same cellular handsets used on 3G networks.

The FLO wireless system has been designed to broadcast real time audio and video signals, apart from non-real time services to mobile users. The respective FLO transmission is carried out using tall and high power transmitters to ensure wide coverage in a given geographical area. Further, it is common to deploy 3-4 transmitters in most markets to ensure that the FLO signal reaches a significant portion of the population in a given market. During the acquisition process of a FLO data packet several determinations and computations are made to determine such aspects as frequency offsets for the respective wireless receiver. Given the nature of FLO broadcasts that support multimedia data acquisitions, efficient processing of such data and associated overhead information is paramount. For instance, when determining frequency offsets or other parameters, complex processing and determinations are required where determinations of phase and associated angles are employed to facilitate the FLO transmission and reception of data. Merely running a conventional program algorithm to determine such parameters would likely consume too much processor bandwidth and also add cost to the wireless receiver.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for determining phase and frequency information in an efficient manner that conserves processing bandwidth in a wireless receiver. In one embodiment, a first look up table is employed to compute an arc tangent function that is used to determine frequency and phase information in a forward link only wireless receiver. Before computing the lookup, an inverse lookup table can be applied to streamline portions of the computation (e.g., compute portions of a denominator) and reduce overall complexity of the operation. Furthermore, based on analysis, the respective tables can be limited in range of degrees or radians to facilitate efficient determinations of the function. Such analysis allows signed arithmetic information to be added after computation and thus allowing the tables to operate over a smaller region of arc. In another embodiment, a method is provided to compute a one shot frequency estimate. The method includes representing an arc tangent function in a table that describes elements of the function and employing the arc tangent function to compute phase information for a wireless device.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for efficiently determining frequency estimates in a forward link only wireless receiver. In one embodiment, a method is provided to compute a one shot frequency estimate. The method includes representing an arc tangent function in a table that describes elements of the function and employing the arc tangent function to compute phase information for a wireless device. Other aspects include employing the arc tangent function to determine a frequency estimate for the wireless device where a second table can be added to perform an inverse look up and facilitate computation efficiency.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
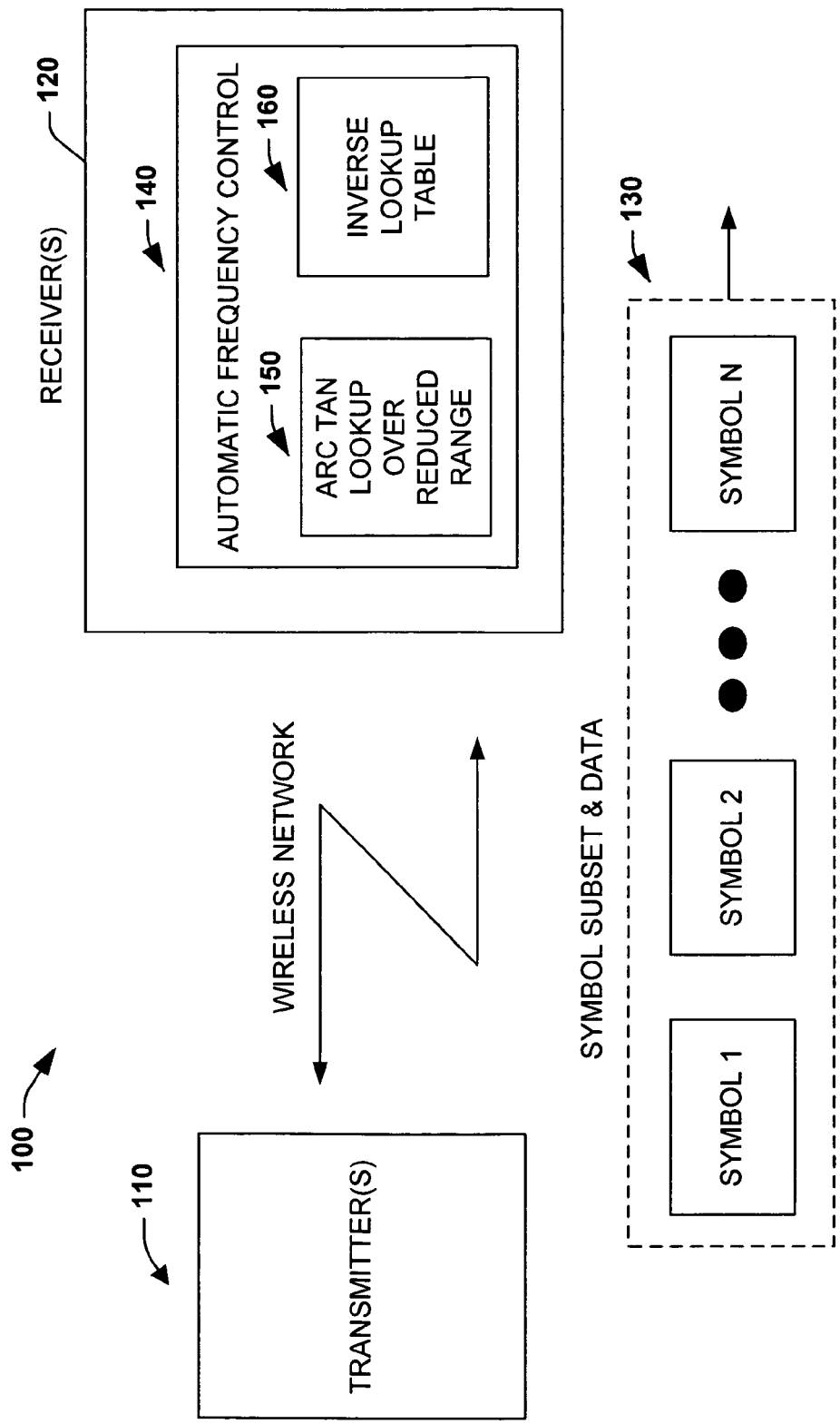
FIG. 1 is a schematic block diagram illustrating a frequency estimator for a wireless receiver.

FIG. 1 illustrates a wireless network system 100 for determining frequency and phase estimates. The system 100 includes one or more transmitters 110 that communicate across a wireless network to one or more receivers 120. The receivers 120 can include substantially any type of communicating device such as a cell phone, computer, personal assistant, hand held or laptop devices, and so forth. Portions of the receiver 120 are employed to decode a symbol subset 130 and other data such as multimedia data. The symbol subset 130 is generally transmitted in an Orthogonal Frequency Division Multiplexing (OFDM) network that employs forward link only (FLO) protocols for multimedia data transfer. Channel estimation is generally based on uniformly spaced pilot tones inserted in the frequency domain, and in respective OFDM symbols. The pilots are spaced 8 carriers apart, and the number of pilot carriers is set at 512. Other receiver functions include an automatic frequency control block 140 (AFC) that employs an arc tangent lookup table 150 and/or an inverse lookup table 160 to determine frequency offsets within the AFC block. It is to be appreciated the tables 150 and 160 can be employed to perform a plurality of functions such as phase determinations and other trigonometric computations. Also, these and other related components that are described in more detail below can be employed for angle determinations in other portions of the wireless receiver 120 than the AFC block, if desired. Although the tables 150 and 160 are shown separately, it is to be appreciated that such tables could occupy a similar area in memory and thus could be considered part of the same table even though functionality of the respective tables differs.

Figure 2:
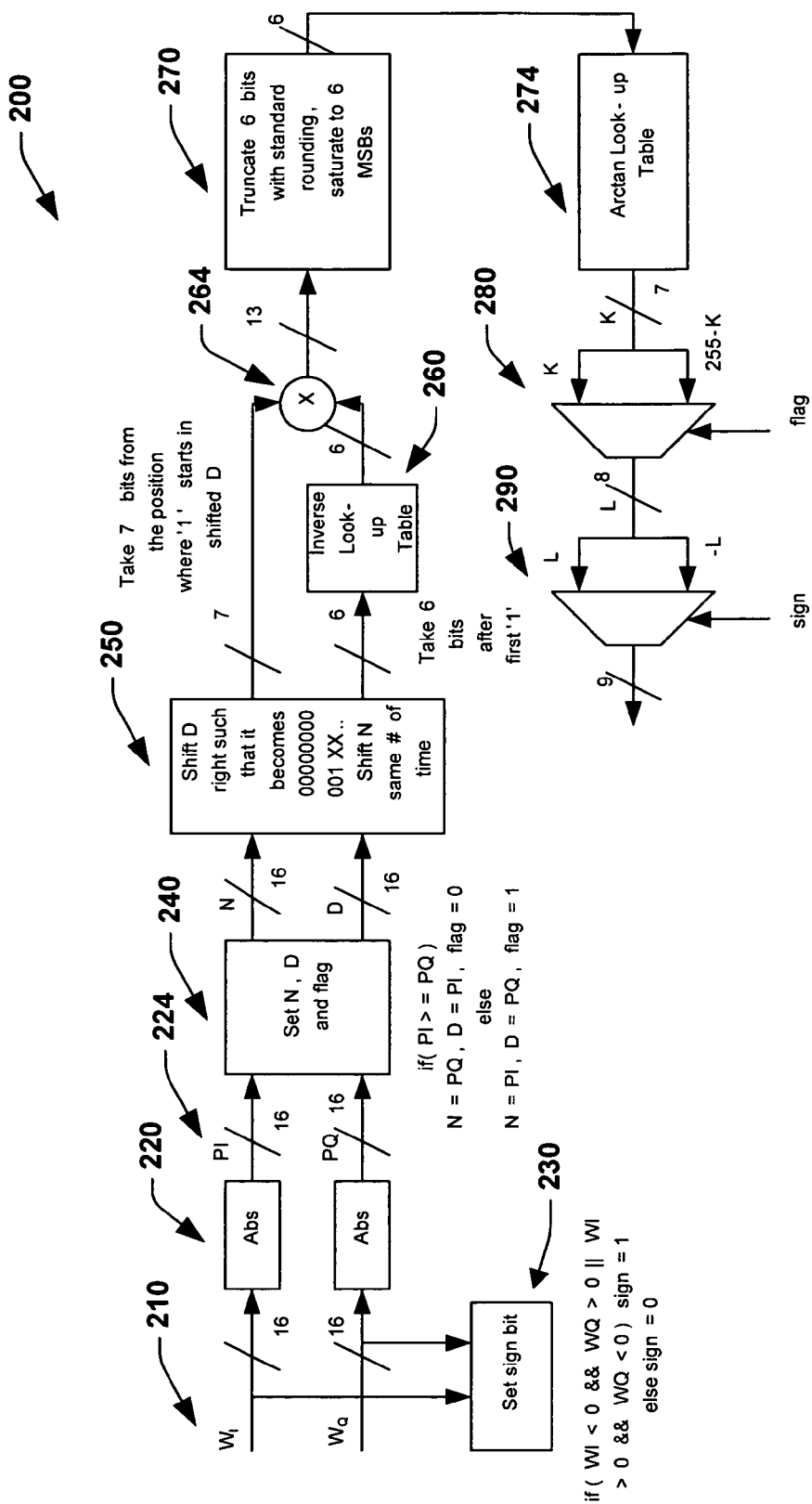
FIG. 2 an example block diagram for determining an arc tangent function.
Figure 3:
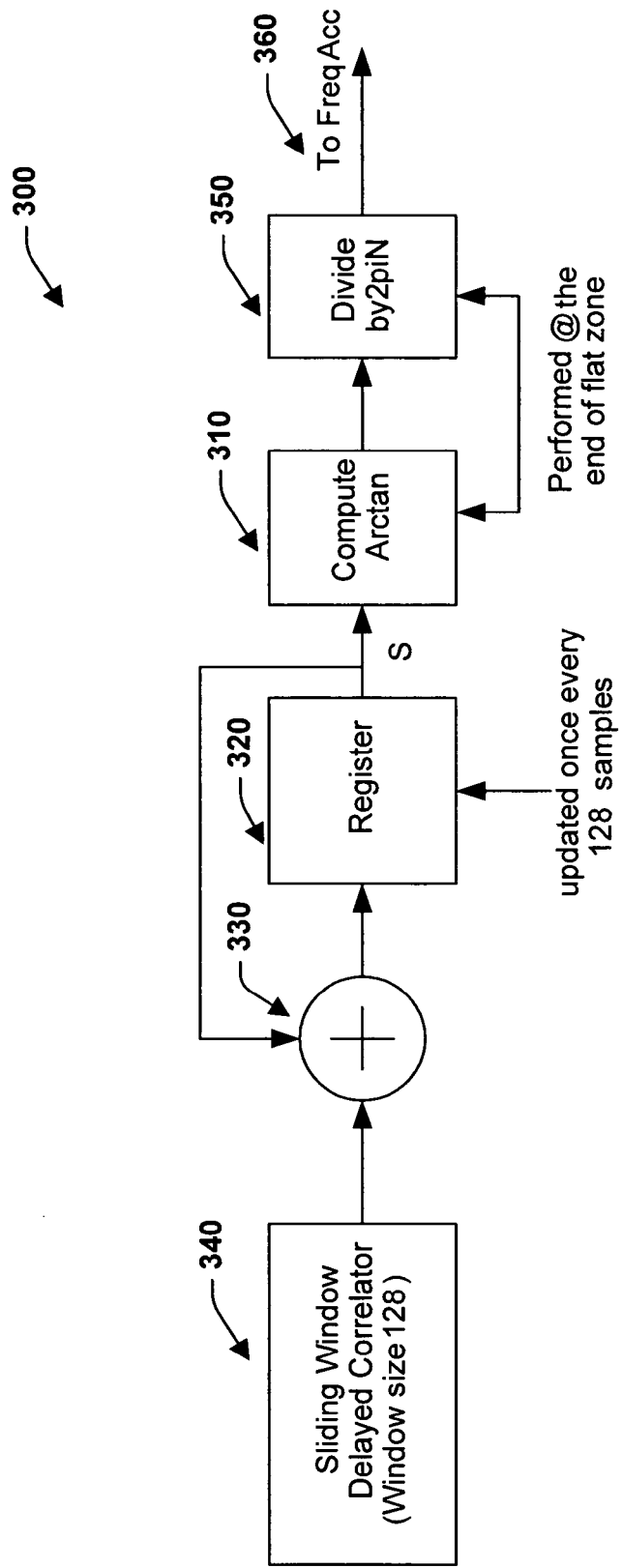
FIG. 3 illustrates an example one-shot frequency estimator block employing an arc tangent function block.
Figure 4:
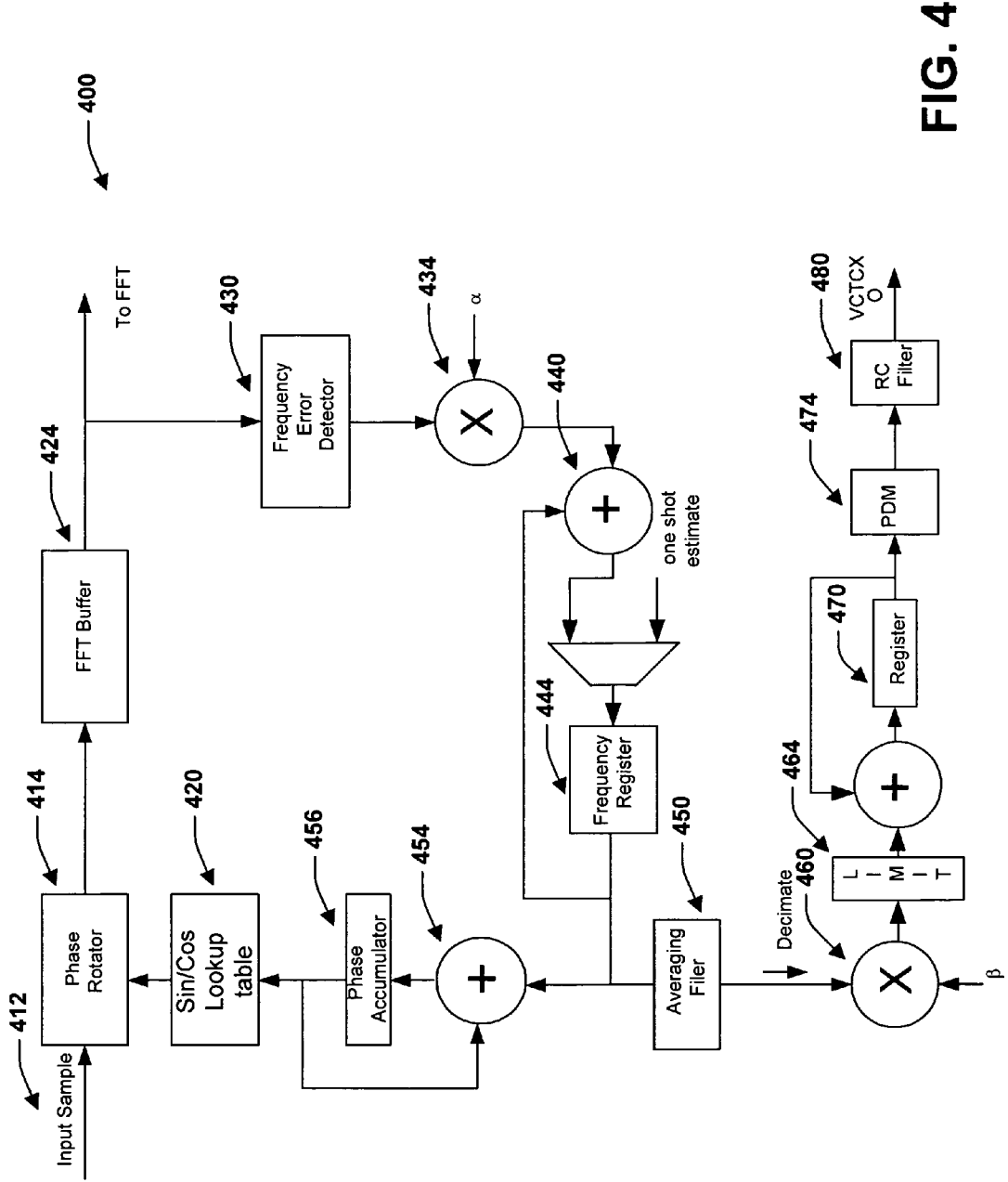
FIG. 4 illustrates an example automatic frequency control block that employs a frequency value determined from a one-shot frequency estimator block.

In one aspect, the arc tangent table 150 is employed to compute an arc tangent function that is used to determine frequency and/or phase information in the wireless receiver 120. Before computing the lookup to determine a respective angle, the inverse lookup table 160 can be applied to streamline portions of the computation such as computing portions of a numerator or denominator before computing the arc tangent. By bifurcating lookups between actual angle determinations and intermediate arithmetic processes, overall complexity of wireless receiver operations can be reduced. In another aspect, the respective tables 150 or 160 can be limited in range of degrees or radians to facilitate efficient determinations of the arc tangent function. Such analysis allows signed arithmetic information to a) be determined outside of the trigonometric computation thus conserving processor recourses, and b) to be added after the computation and thus allowing the tables 150 and 160 to operate over a smaller region of arc. FIGS. 2-4 will now illustrate and describe in more detail specific examples for one shot frequency estimates employing the tables 150 and 160. As noted above, other portions of the wireless receiver 120 may also employ these and other associated components to determine arc tangent related functionality. In another aspect, the system 200 is provided for determining angles in a wireless network. The system includes means for receiving a symbol stream (e.g., reference 120) means for performing an inverse lookup to determine a 1/x function (e.g., reference 160), and means for performing an arc tangent lookup (e.g., reference 150) that is applied after the inverse lookup to determine an angle for a wireless component.

FIG. 2 illustrates an example block 200 for determining an arc tangent function. Before proceeding with a more detailed discussion, a signal flow description is provided. Also, it is to be appreciated that the components depicted in the examples of FIGS. 2-4 can be provided as software components, hardware components, and/or a combination thereof. At 210, two 16 bit inputs WI and WQ are fed to absolute value components at 220 to generate non-signed values PI and PQ at 224. The values WI and WQ at 210 are also compared to each other to generate a sign bit at 230 according to the statement: if (WII<0 && WQ>0||WI>0 && WQ<0) sign=1; else sign=0. At 224, PI and PQ are fed to a component 240 to set a numerator or denominator flag according to the statements: if (PI>=PQ) N=PQ, D=PI, flag=0 else, N=PI, D=PQ, flag is equal to 1. A shift register 250 then processes numerator and denominator values where the values in the denominator are shifted right until it becomes 00000000001XX . . . and the numerator is shifted the same number of times. It is noted that in one example, the decimal point is after five least significant bits. From the shift register 250, six bits of the shifted denominator are supplied to an inverse lookup function 260 and multiplied at 264 with the respective seven bits of the shifted numerator that reside in the shift register 250 starting after the first binary 1 appears. At 270, 6 bits from a 13 bit value are truncated via standard rounding and then saturated to six bits where these bits are then supplied to an arc tangent lookup table at 274 before flag and sign information are added to the arc tangent value at 280 and 290 respectively. It is noted that from the block 200, terms WI and WQ represent SI and SQ where SI and SQ are real and imaginary components of complex S which is described below. PI and PQ are absolute values of WI and WQ, where the term K from the drawing at 280 denotes the output of the arc tangent look-up table 274 and L at 290 is equal to K or 255-K as selected by the multiplexer at 280.

In one aspect, during the signal acquisition process, one-shot estimation is used to calculate a frequency offset. This can be based on a TDM pilot1 detection and delayed correlation; where the normalized frequency error (with respect to the inter-carrier frequency) is generally computed at the end of TDM pilot1 detection from the sum of the delayed correlator output as shown below in FIG. 3 where S is an accumulated sum:

$$\hat{\Delta f} = \frac{1}{2\pi \cdot 128} \arctan[S]$$

Arc tangent is computed via the two lookup tables at 260 and 274 respectively. In order to utilize two lookup tables in an efficient manner, several component considerations are applied. The first lookup table 260 provides the inverse (1/x) and the second lookup table 274 provides the actual arc tangent value normalized to 2 pi. In one aspect from analyses, it can be assumed that the frequency offset is within the range of −pi/2 to pi/2. Therefore, without ambiguity, only one arc tangent table which corresponds to 0 to pi/2 need be employed since the sign can be added at a later time at 290. It is to be appreciated that more than one arc tangent table can be employed if desired. Moreover, as arctan (x)+arctan (1/x)=pi/2, it is sufficient to consider the case where x is larger than 1. At the lookup table for 1/x at 260, this lookup table can be efficiently used by allowing x to be between 1 and 2. Thus, the inverse at 260 is performed after scaling both numerator and denominator at 250. As can be appreciated, the block 200 can be implemented as part of other components that are described in more detail below.

FIG. 3 illustrates an example one-shot frequency estimator block 300. The block 300 includes a compute arc tangent block 310 which performs similarly to the block 200 described above with respect to FIG. 2. Output from a register 320 (S) is changed once per 128 samples although other sampling amounts could be employed. The output is summed at 330 with a sliding window correlator 340 which provides input to the register 320. After computing the arc tangent at 310, a divider component 350 divides the arc tangent computation from 310 by 2 pi N to generate a frequency value at 360 which is fed to an automatic frequency control block described in FIG. 4.

FIG. 4 illustrates an example automatic frequency control (AFC) block 400 that employs the frequency value determined at 360 of FIG. 3. The AFC block receives a one-shot frequency estimate at 410 which was generated as output 360 from FIG. 3. A plurality of components may be employed within the AFC block 440. At 412, input samples are received and supplied to a phase rotator 414 which receives information from a sin and cosine lookup table at 420. Output from the phase rotator 414 is supplied to an FFT buffer 424 which is fed to a frequency error detector 430. Output from the frequency error detector 430 is multiplied with an alpha parameter at 434 and summed at 440 with output from a frequency register at 444, where the frequency register 444 accumulates the one-shot frequency estimate 410. Output from the frequency register 444 is sent to an averaging filter and summer 454, where output from the summer 454 is fed to a phase accumulator 456 and then the sin and cosine lookup table 420. Output from the averaging filter 454 is multiplied by a parameter beta at 460 and supplied to a limit component or detector at 464. Output from 464 is subsequently processed by a register 470, a PDM component 474, and an RC filter 480.

Figure 5:
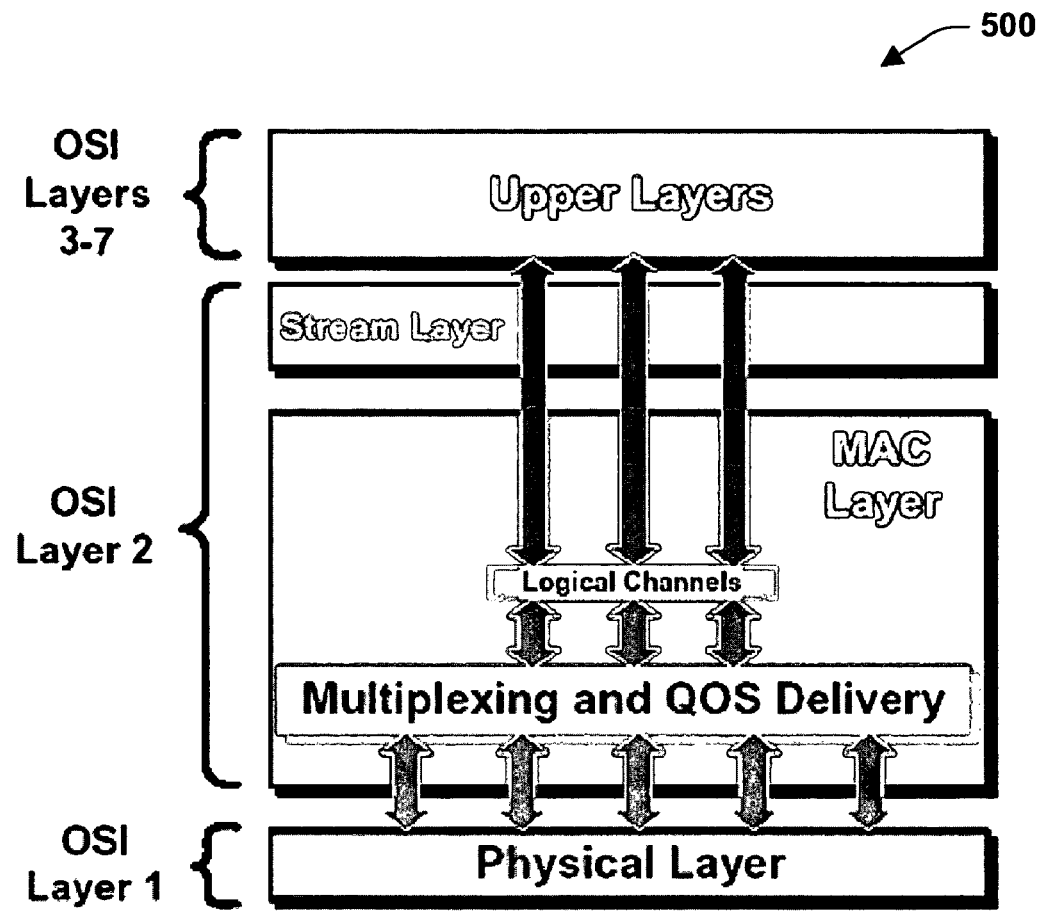
FIG. 5 is a diagram illustrating example network layers for a wireless system.

FIG. 5 illustrates example network layers 500 for a wireless system where data received there from may be employed in the frequency blocks described above. A Forward Link Only (FLO) air interface protocol reference model is shown in FIG. 5. Generally, the FLO air interface specification covers protocols and services corresponding to OSI6 having Layers 1 (physical layer) and Layer 2 (Data Link layer). The Data Link layer is further subdivided into two sub-layers, namely, Medium Access (MAC) sub-layer, and Stream sub-layer. Upper Layers can include compression of multimedia content, access control to multimedia, along with content and formatting of control information.

The FLO air interface specification typically does not specify the upper layers to allow for design flexibility in support of various applications and services. These layers are shown to provide context. The Stream Layer includes multiplexes up to three upper layer flows into one logical channel, binding of upper layer packets to streams for each logical channel, and provides packetization and residual error handling functions. Features of the Medium Access Control (MAC) Layer includes controls access to the physical layer, performs the mapping between logical channels and physical channels, multiplexes logical channels for transmission over the physical channel, de-multiplexes logical channels at the mobile device, and/or enforces Quality of Service (QOS) requirements. Features of Physical Layer include providing channel structure for the forward link, and defining frequency, modulation, and encoding requirements In general, FLO technology utilizes Orthogonal Frequency Division Multiplexing (OFDM), which is also utilized by Digital Audio Broadcasting (DAB)7, Terrestrial Digital Video Broadcasting (DVB-T)8, and Terrestrial Integrated Services Digital Broadcasting (ISDB-T)9. Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 6:
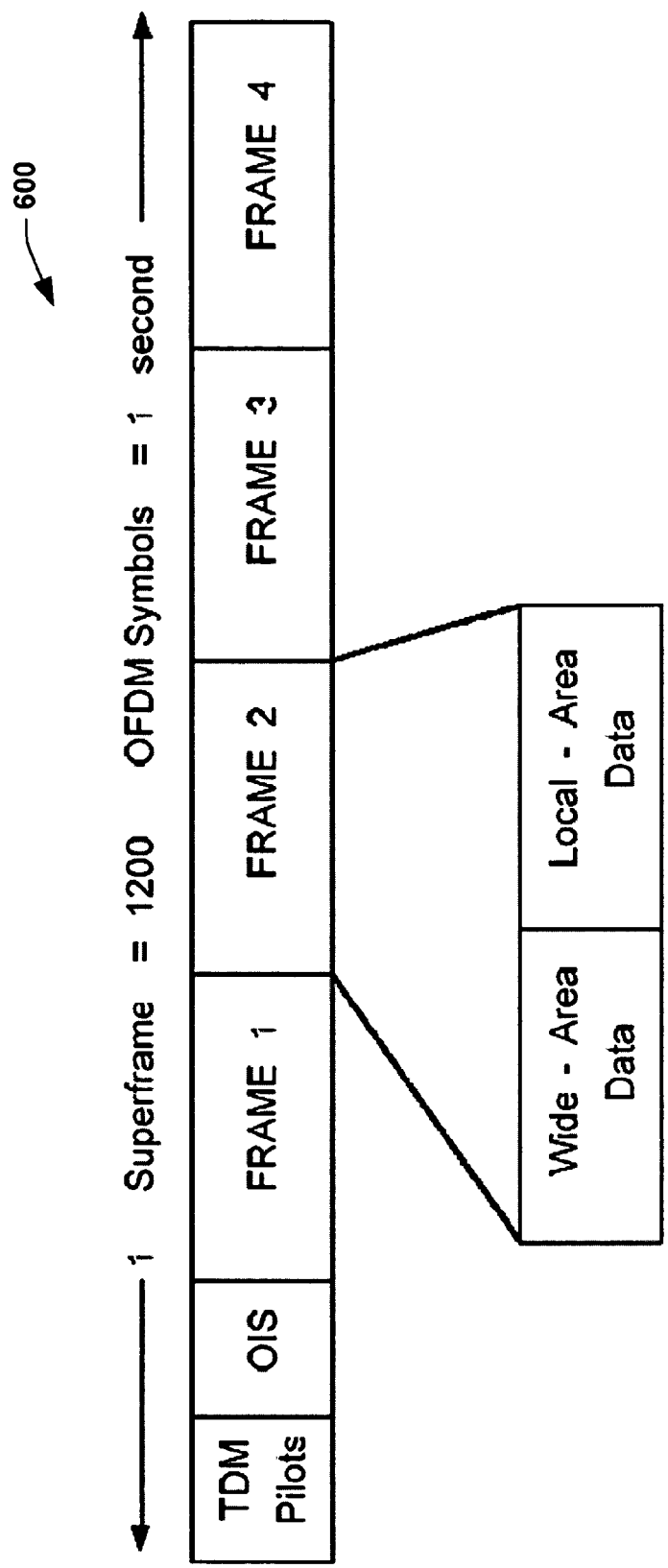
FIG. 6 is a diagram illustrating an example data structure and signal for a wireless system.

Proceeding to FIG. 6, a FLO physical layer 600 is illustrated. The FLO physical layer uses a 4K mode (yielding a transform size of 4096 sub-carriers), providing superior mobile performance compared to an 8K mode, while retaining a sufficiently long guard interval that is useful in fairly large SFN cells. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times. Generally, FLO transmitted signals are organized into super frames as illustrated at 600. Each super frame is comprised of four frames of data, including TDM pilots (Time Division Multiplexed), Overhead Information Symbols (OIS) and frames containing wide-area and local-area data. The TDM pilots are provided to allow for rapid acquisition of the OIS. The OIS describes the location of the data for each media service in the super frame.

Typically, each super frame consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed. Generally, FLO incorporates a turbo inner code 13 and a Reed Solomon (RS) 14 outer code. Typically, the turbo code packet contains a Cyclic Redundancy Check (CRC). The RS code need not be calculated for data that is correctly received, which, under favorable signal conditions, results in additional power savings. Another aspect is that the FLO air interface is designed to support frequency bandwidths of 5, 6, 7, and 8 MHz. A highly desirable service offering can be achieved with a single Radio Frequency channel.

Figure 7:
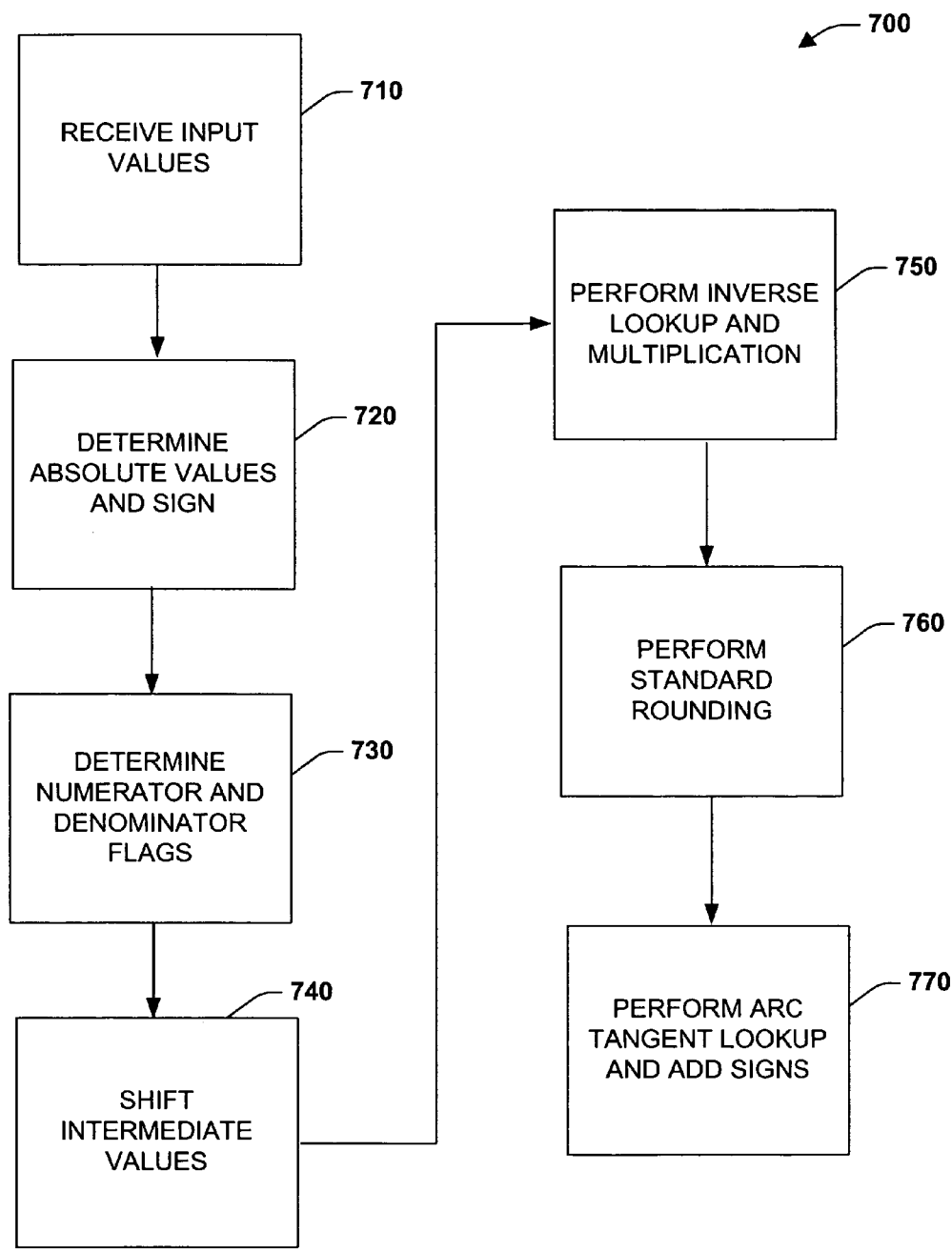
FIG. 7 illustrates an example angle determination process for a wireless system.

FIG. 7 illustrates an example angle determination process 700 for wireless systems. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 710, input values such as WI and WQ noted above are processed for absolute value at 720 to generate intermediate non-signed values PI and PQ. The values WI and WQ can also be compared to generate a sign bit according to the statement: if (WII<0 && WQ>0||WI>0 && WQ<0) sign=1; else sign=0. At 730, values PI and PQ are analyzed to set a numerator or denominator flag according to the statements: if (PI>=PQ) N=PQ, D=PI, flag=0 else, N=PI, D=PQ, flag is equal to 1. At 740, intermediate values PI and PQ are shifted where the values in the denominator are shifted right until they become 00000000001XX . . . and the numerator is shifted a similar number of times. After shifting at the intermediate values at 740, six bits from the shifted denominator are supplied to an inverse lookup function and multiplied with the respective seven bits of the shifted numerator at 750. Six bits from a 13 bit value from the inverse lookup and multiplication at 750 are truncated via standard rounding and saturated to six bits at 760 where these bits are then supplied to an arc tangent lookup table at where flag and sign information can also be added to the arc tangent value.

As noted previously, during the signal acquisition process, one-shot estimation can be employed to calculate a frequency offset. This can be based on a TDM pilot1 detection and delayed correlation; where the normalized frequency error (with respect to the inter-carrier frequency) is generally computed at the end of TDM pilot1 detection from the sum of the delayed correlator output where a value S is an accumulated sum:

$$\hat{\Delta f} = \frac{1}{2\pi \cdot 128} \arctan[S]$$

Arc tangent is computed via the two lookup tables at 750 and 770 respectively. The first lookup table provides the inverse (1/x) and the second lookup table provides the actual arc tangent value normalized to 2 pi. In one aspect from analyses, it can be assumed that the frequency offset is within the range of −pi/2 to pi/2. Therefore, without ambiguity, only one arc tangent table which corresponds to 0 to pi/2 need be employed since the sign can be added at a later time. As arctan (x)+arctan (1/x)=pi/2, it is sufficient to consider the case where x is larger than 1. At the lookup table for 1/x, this lookup table can be efficiently used by allowing x to be between 1 and 2.

Figure 8:
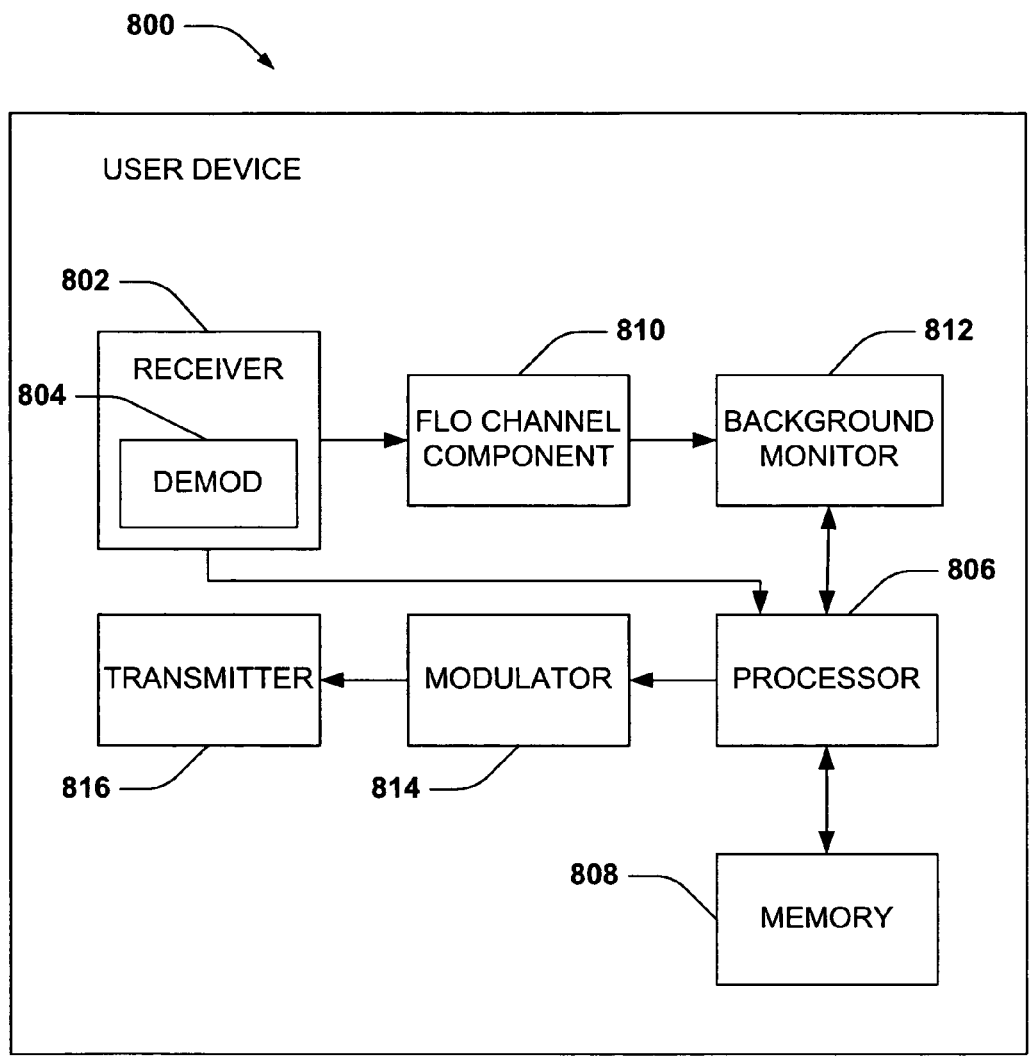
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a non-linear receiver. A demodulator 804 can demodulate and provide received pilot symbols to a processor 806 for channel estimation. A FLO channel component 810 is provided to process FLO signals as previously described. This can include digital stream processing and/or positioning location calculations among other processes. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to calculated ranks for user device 800, a rank calculation protocol, lookup table(s) comprising information related thereto, and any other suitable information for supporting list-sphere decoding to calculate rank in a non-linear receiver in a wireless communication system as described herein. Memory 808 can additionally store protocols associated rank calculation, matrix generation, etc., such that user device 800 can employ stored protocols and/or algorithms to achieve rank determination in a non-linear receiver as described herein.

It will be appreciated that the data store (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

Figure 9:
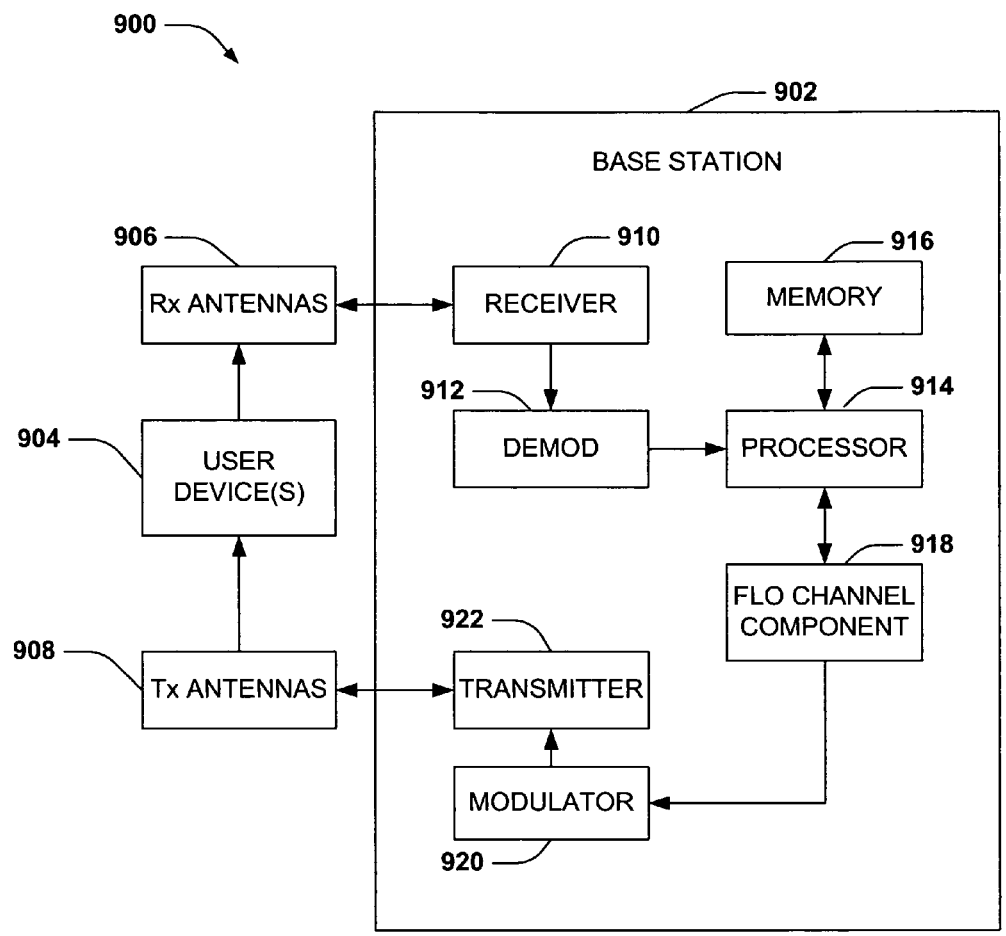
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above with regard to FIG. 8, and which is coupled to a memory 916 that stores information related to user ranks, lookup tables related thereto, and/or any other suitable information related to performing the various actions and functions set forth herein. Processor 914 is further coupled to a FLO channel 918 component that facilitates processing FLO information associated with one or more respective user devices 904.

A modulator 922 can multiplex a signal for transmission by a transmitter 924 through transmit antenna 908 to user devices 904. FLO channel component 918 can append information to a signal related to an updated data stream for a given transmission stream for communication with a user device 904, which can be transmitted to user device 904 to provide an indication that a new optimum channel has been identified and acknowledged. In this manner, base station 902 can interact with a user device 904 that provides FLO information and employs a decoding protocol in conjunction with a non-linear receiver, such as an ML-MIMO receiver, and so forth.

Figure 10:
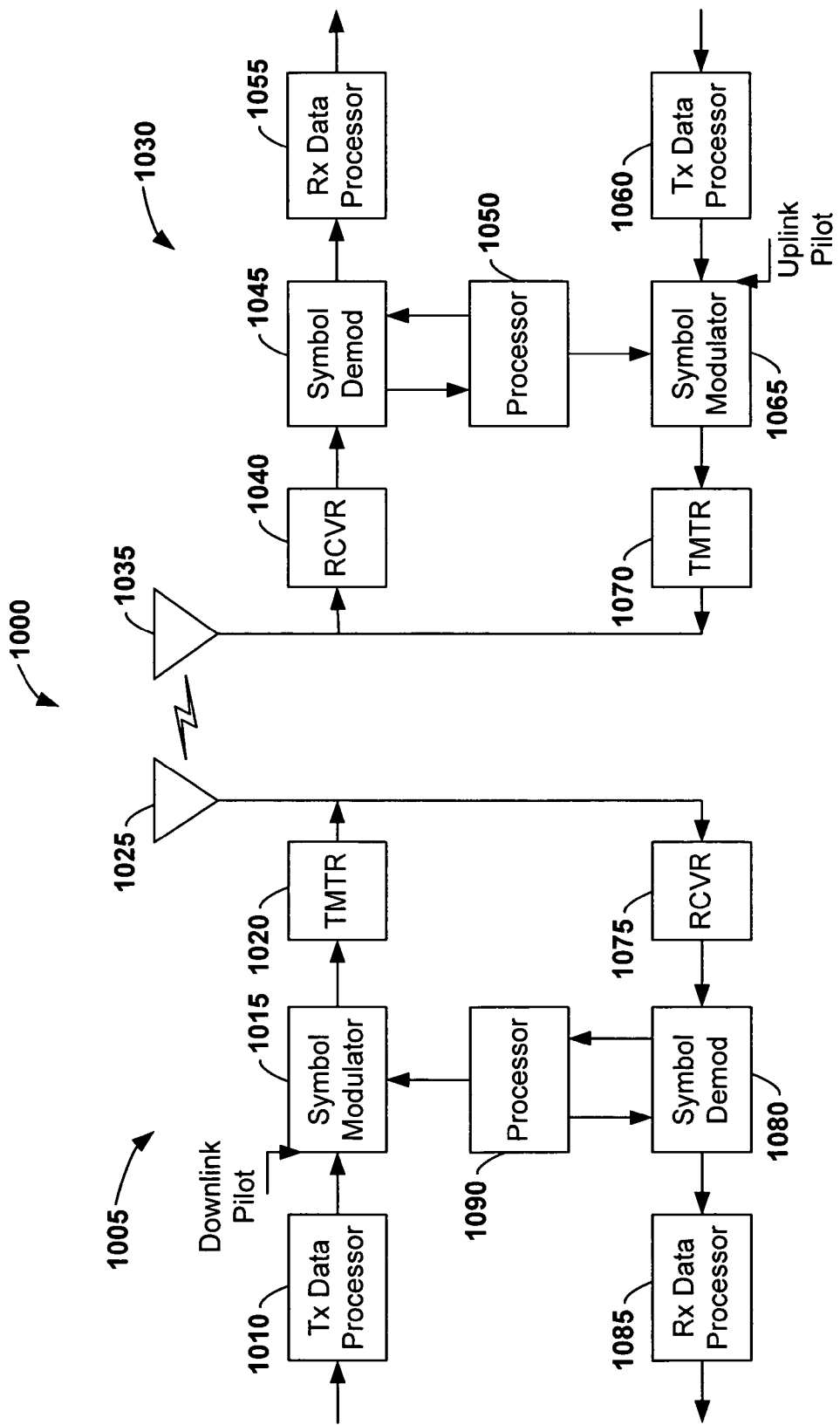
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to compute a one shot frequency estimate, comprising:
   representing an inverse function in an inverse table that describes values of 1/x for a given x;
   representing an arc tangent function in an arc tangent table that describes elements of the arc tangent function; and
   employing the inverse table and the arc tangent table to compute phase information for a wireless device.

2. The method of claim 1, further comprising employing the arc tangent table to determine a frequency estimate for the wireless device.

3. The method of claim 1, wherein the given x comprises a demodulated value of received symbols at the wireless device. second table to perform an inverse look up and facilitate computation efficiency.

4. The method of claim 1, wherein the given x is in a range from about 1 to about 2.

5. The method of claim 1, further comprising limiting the range of the arc tangent table to be less than 2 pi radians.

6. The method of claim 4, wherein the range of the arc tangent table is from about 0 radians to about pi/2 radians.

7. The method of claim 4, further comprising adding an arithmetic sign of plus or minus after employing the arc tangent table.

8. The method of claim 1, further comprising determining a change in frequency via the following equation $$\hat{\Delta f} = \frac{1}{2\pi \cdot 128} \arctan[S],$$

where 128 is a number of samples and S is comprised of real and imaginary components WQ and WI.

9. The method of claim 8, further comprising applying an absolute value to the components WQ and WI to produce unsigned PQ and PI values.

10. The method of claim 9, further comprising shifting the values of PQ and PI to form a numerator and a denominator where the denominator is applied to an inverse lookup table.

11. The method of claim 10, further comprising truncating a value that was generated from the inverse lookup table via rounding operations to produce an input value for an arc tangent lookup table.

12. The method of claim 11, further comprising generating an arc tangent value that is applied to a one-shot frequency estimator.

13. The method of claim 12, generating an output value from the one-shot frequency estimator and employing the value in an automatic frequency control block.

14. The method of claim 1 wherein the inverse table is employed prior to employing the arc tangent table to compute the phase information.

15. The method of claim 14, further comprising truncating a value generated from the inverse table via rounding operations to produce an input value for the arc tangent table.

16. The method of claim 15 further comprising employing the computed phase information in an automatic frequency control function.

17. The method of claim 1, further comprising determining the given x from a received signal at the wireless device.

18. A machine readable medium having machine executable instructions stored thereon, comprising:
   determining a one-shot frequency estimate from an arc tangent lookup table;
   applying an inverse lookup function for determining a value of 1/x for a given x to the arc tangent lookup table; and
   applying an output generated from the one-shot frequency estimate in an automatic frequency control function.

19. The machine readable medium of claim 18, wherein the machine executable instructions further comprise limiting the range of the arc tangent lookup table to be less than 2 pi radians.

20. The machine readable medium of claim 18, wherein the given x is in a range from about 1 to about 2.

21. The machine readable medium of claim 18, wherein the range of the arc tangent lookup table is from about 0 radians to about pi/2 radians.

22. The machine readable medium of claim 21, wherein the machine executable instructions further comprise adding an arithmetic sign of plus or minus after determining the one-shot frequency estimate from the arc tangent lookup table.

23. The machine readable medium of claim 18, wherein the machine executable instructions further comprise determining the given x from a received signal at a wireless device.

24. The machine readable medium of claim 23, wherein the given x comprises a demodulated value of received symbols of the received signal at the wireless device.

25. The machine readable medium of claim 24, wherein the machine executable instructions further comprise determining a change in frequency via the following equation $$\hat{\Delta f} = \frac{1}{2\pi \cdot 128} \arctan[S],$$

wherein 128 is a number of samples and S is an accumulated sum of a correlation value of the received signal and is comprised of real and imaginary components WQ and WI.

26. The machine readable medium of claim 18, wherein the machine executable instructions further comprise truncating a value that was generated from the inverse lookup function via rounding operations to produce an input value for determining the one-shot frequency estimate from the arc tangent lookup table.

27. A processor that executes instructions for a wireless network, the instructions comprising:
   computing a frequency estimate from an arc tangent lookup table;
   determining an inverse lookup function for determining a value of 1/x from a demodulated value x of received symbols at a wireless receiver in accordance with the arc tangent lookup table; and
   employing the frequency estimate in an automatic frequency control function.

28. The processor of claim 27, wherein the instructions further comprise limiting the range of the arc tangent lookup table to be less than 2 pi radians.

29. The processor of claim 27, wherein the demodulated value x is in a range from about 1 to about 2.

30. The processor of claim 27, wherein the range of the arc tangent lookup table is from about 0 radians to about pi/2 radians.

31. The processor of claim 29, wherein the instructions further comprise adding an arithmetic sign of plus or minus after computing the frequency estimate from the arc tangent lookup table.

32. The processor of claim 27, wherein the instructions further comprise determining a change in frequency via the following equation $$\hat{\Delta f} = \frac{1}{2\pi \cdot 128} \arctan[S],$$

wherein 128 is a number of samples and S is an accumulated sum of a correlation value of a received signal and is comprised of real and imaginary components WQ and WI.

33. The processor of claim 32, wherein the instructions further comprise applying an absolute value to the components WQ and WI to produce unsigned PQ and PI values.

34. The processor of claim 27, wherein the instructions further comprise truncating a value that was generated from the inverse lookup function via rounding operations to produce an input value for computing the frequency estimate from the arc tangent lookup table.

* * * * *

UNITED STATES PATENT AND TRADEMARK OFFICE
CERTIFICATE OF CORRECTION

PATENT NO. : 7,920,658 B2  
APPLICATION NO. : 11/369328  
DATED : April 5, 2011  
INVENTOR(S) : Gupta Page 1 of 1

It is certified that error appears in the above-identified patent and that said Letters Patent is hereby corrected as shown below:

IN THE CLAIMS:

Column 11, line 23, claim 3: "device. second table to perform an inverse look up and facilitate computation efficiency." to read as --device.--

Signed and Sealed this  
Third Day of January, 2012

David J. Kappos  
*Director of the United States Patent and Trademark Office*